United States Patent [19]

Vogelgesang

[11] Patent Number: 5,022,018
[45] Date of Patent: Jun. 4, 1991

[54] SYSTEM FOR APPLYING A PERPENDICULAR MAGNETIC FIELD TO THE ILLUMINATED SIDE OF A MAGNETO-OPTIC MEDIUM

[75] Inventor: Peter J. Vogelgesang, Roseville, Minn.

[73] Assignee: Minnesota Mining and Manufacturing Company, St. Paul, Minn.

[21] Appl. No.: 311,457

[22] Filed: Feb. 16, 1989

[51] Int. Cl.[5] .............................................. G11B 13/04
[52] U.S. Cl. ...................................... 369/13; 360/114; 360/59
[58] Field of Search ................... 369/13; 360/114, 59; 365/122

[56] References Cited

U.S. PATENT DOCUMENTS

| | | | |
|---|---|---|---|
| 4,340,914 | 7/1982 | Hansoka | 360/59 |
| 4,466,004 | 8/1984 | Kobayashi et al. | 346/74.4 |
| 4,477,852 | 10/1984 | Ota et al. | 360/114 |
| 4,497,006 | 1/1985 | Deguchi et al. | 360/114 |
| 4,610,009 | 9/1986 | Connell | 369/110 |
| 4,660,190 | 4/1987 | Fujii et al. | 369/13 |
| 4,701,894 | 10/1987 | Watson | 369/13 |
| 4,803,674 | 2/1989 | Nakao et al. | 360/114 |
| 4,868,802 | 9/1989 | Kobori | 369/13 |

FOREIGN PATENT DOCUMENTS

| | | | |
|---|---|---|---|
| 59-148159 | 8/1984 | Japan | 360/114 |
| 60-214438 | 10/1985 | Japan | 360/114 |
| 60-214439 | 10/1985 | Japan | 360/114 |
| 60-261052 | 12/1985 | Japan | 369/13 |

Primary Examiner—Stuart S. Levy
Assistant Examiner—Hoa Nguyen
Attorney, Agent, or Firm—Gary L. Griswold; Walter N. Kirn; Charles D. Levine

[57] ABSTRACT

An apparatus for providing a bias magnetic field coincident with the read/write laser in a magneto-optic recording system is disclosed, with special utility for systems wherein the thickness or configuration of the media necessitates a functioning bias magnet being located on the same side of the media as the read/write laser.

8 Claims, 3 Drawing Sheets

SYSTEM FOR APPLYING A PERPENDICULAR MAGNETIC FIELD TO THE ILLUMINATED SIDE OF A MAGNETO-OPTIC MEDIUM

FIELD OF THE INVENTION

This invention relates to erasable optical recording systems, particularly so-called magneto-optical recording systems.

BACKGROUND OF THE INVENTION

High density optical recording systems which may be used for recording and playing back information are well known in the art. Current practice in the optical recording field can be broadly distinguished into three categories, the classification being largely dependent on the physical and chemical characteristics of the information carrying media. Common to all three categories is the ability of each system to have the information stored on the media to at least be "read" or "played back" by irradiating selected areas of the media with a highly focused source of light, usually a laser. Changes in the transmission or reflection of the laser beam caused by the presence or absence of recorded information on the media is detected by suitable optical sensors. The three categories are differentiated by the media's response to radiation. "Read Only" as, for example, in Compact Disk technology, wherein all the information on the disk is pre-recorded. "Write-Once, Read (Mainly)" (WORM), in which information can be written on the media by the laser, read back by a laser at reduced power levels, but cannot be erased for correction or re-use. The third consists of media which can be written upon and read back by laser, but can also be erased (by the laser), in the presence of a suitable magnetic field, and which then can be reused.

This invention, relates generally to the "erasable" optical recording systems, known in the art as magneto-optical recording systems, and in which the media is described as magneto-optic media.

A magneto-optic recording medium is a magnetic material which causes the polarization angle of laser light to be changed when it is reflected from or transmitted through a recorded spot. Preparatory to the initial recording operation, the magneto-optic media is vertically magnetized in the same direction across the entire recording surface. During recording, the direction of magnetization of the media is reversed at the point of incidence of the laser beam due to the presence of a vertical magnetic field of a given strength and polarity and heating induced by a laser. Illumination from a playback laser beam of lower power reflected from this area will show a polarization angle change, which is detectable by suitable optical sensors. The erasing process restores the original magnetic direction which existed prior to recording by the use of a vertical magnetic field of polarity opposite to that used for recording when accompanied by heating from the laser beam. Traditionally, an electromagnet in which the current can be adjusted and reversed, (thereby changing the direction and/or intensity of the induced magnetic field) has been the preferred source for generating the magnetic bias for both the writing and the erasing. The electromagnet (in some cases, a reversible permanent magnet) is also sometimes referred to as the bias magnet.

Deguchi et al, in U.S. Pat. No. 4,497,006, schematically describe in their disclosure an electromagnet surrounding the objective lens of their recording/playback apparatus which provides the bias magnetization required for magneto-optic operations. Ota et al, in U.S. Pat. No. 4,477,852, discloses a pair of bias electromagnets adjacent the objective lens in conjunction with a pair of lasers for performing the erase and re-write functions in a magneto-optic recording and reproducing system. U.S. Pat. No. 4,466,004 also describes an electromagnet surrounding the objective lens, and records information by varying the field strength of the electromagnet in the areas of the media heated by a continuous laser beam. In the previous two examples, writing was accomplished by varying the intensity of the laser beam.

U.S. Pat. No. 4,610,009, assigned to the Xerox Corporation, describes a system wherein plural lasers operate through a single optical path and cooperate with bipolar magnetic field producing means located on the opposite side of the magneto-optic medium. This system also includes a bias electromagnet essentially concentric with the focusing electromagnet of the objective lens. The deficiencies of these examples in providing an essentially vertical magnetic field coincident with the laser beam is addressed in U.S. Pat. No. 4,340,914 issued to Hanaoka and assigned to Olympus Optical. This patent discloses an auxiliary magnetic pole piece for focusing a magnetic flux from the magnetic field generating device (bias magnet) into at least the heated portion and which is located on the side of the media opposite the laser beam.

The teachings of U.S. Pat. No. 4,701,894, assigned to RCA, further address the problem of providing a vertical magnetic field at the point of incidence (with the laser beam) which rely on an electromagnet located around the objective lens, or, in some cases, on the side of the media opposite the laser beam. As discussed in this patent, given the very close proximity between the objective lens of the record/playback optics, there is very little space on the recording side of the media for an electromagnet capable of providing a vertical magnetic field at the point of incidence. This patent discloses a bias electromagnet configured in the shape of a letter "E", in which the top and bottom legs of the "E" extend radially from one edge of the media towards the center (when the media is in a disk configuration, the center leg of the "E" likewise extends from one edge towards the center, but on the opposite side of the media from the top and bottom legs). Current carrying coils are wound about each of the two segments of the vertical portion of the "E" to magnetize the electromagnet. Attached to the housing of the objective lens is a ring or cap of magnetic material which has a small hole in it to allow passage of the laser beam. Magnetic coupling of this cap to the top and bottom legs of the "E" is accomplished by a pair of pole pieces, in effect, filling in the gap between the legs and the cap. The pole pieces, the cap, and the objective lens can move radially in-between the top and bottom of the "E", with the return path of the magnetic flux being provided by the center leg which is located underneath the lens and the media.

When the magneto-optic media is provided on a thin tape or on a thin disk, as described in this patent, the magnetic elements can conveniently be placed on the side of the media opposite the side upon which the laser impinges. However, when this opposite side location is not physically accessible, for example, when the magneto-optic media is supported on the surface of a drum, or is supported on a very thick substrate, these magnetic elements must be located on the same side of the media as the optics are.

It is an object of this invention to provide a device and method of producing the necessary vertical bias magnetic field, essentially in concurrence with the point of incidence of the laser beam upon the media, in which access to the opposite side of the media is denied. It is a further object of this invention to provide the necessary vertical bias magnetic field for systems in which extensive cross-track movement of the optic system is required. It is an additional object of this invention to provide the necessary vertical magnetic field with a reduced number of non-vertical components of the bias magnetic field, and with greatly reduced power requirements for providing the bias magnetic field.

SUMMARY OF THE INVENTION

The present invention describes an apparatus for providing a vertical bias magnetic field coincident with a read/write laser beam in a magneto-optic recording system. It comprises magnetizable material surrounding the end of an objective lens housing of the read/write/erase optical system and extending across the face of the objective lens housing proximate the recording media, a small hole in the magnetizable material extending across the face of said objective lens housing to permit the laser beam to pass through to the recording media, and an electromagnet coil closely surrounding said magnetizable material for purposes of generating the necessary magnetic field.

BRIEF DESCRIPTION OF THE DRAWINGS

The novel features and advantages of the present invention will become more apparent to those skilled in the art upon consideration of the following detailed description which refers to the accompanying drawings wherein.

DETAILED DESCRIPTION OF THE INVENTION

Figure 1:
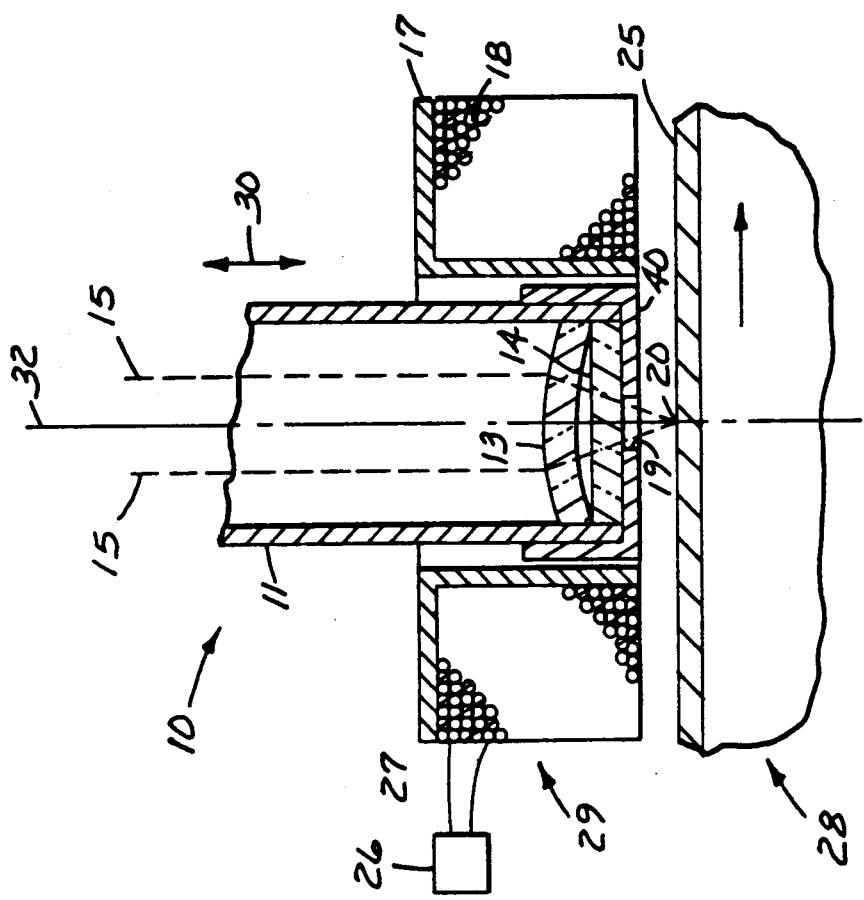
FIG. 1 is a longitudinal cross-sectional view of a first embodiment of the invention.

FIG. 1 illustrates in cross-section the principal components of the invention and their relationship to each other and to a recording medium. An optical system 10 is located in close proximity to record medium 28 with the spatial relationship between them being defined as that necessary to allow radiation from a laser (not shown) to pass through, and along the optical axis 32 of an objective lens housing 11, through an objective lens 13, and eventually arriving, in sharp focus, upon the recording surface 25 of recording media 28. The source of the laser beam 15 as well as the various optical components required to produce the sharp focus are well known in the art and need not be shown nor described here. Means, not shown, provide relative movement of the record media 28 past the focus point 20 of the laser beam 15 so that controlled modulation of the laser will cause successive detectable changes to be generated in the recording surface 25. Since variations in distance between the objective lens 13 and the recording surface 25 are likely to occur at initial assembly of the optical system and during the relative motion therebetween, precise focus of the laser beam at point 20 can be achieved and maintained, for example, by a servomechanism (not shown) that causes the objective lens housing 11 to move up or down as indicated by directional arrow 30, this being a technique well known in optical recording technology for maintaining focus. Lens housing 11 may also support a transparent lens cover glass 14, which is employed to modify the focal length of the lens and to adapt a specific lens design for use with different media constructions. Surrounding the lens housing 11 at the end in proximity with the recording surface 25, is an electromagnet assembly 29, comprising multiple turns of wire 18 wound around a core 17 of ferromagnetic material such as soft iron. Wire retaining means can consist of so-called potting compounds which serve to both position the wires and define the outer dimensions of the coil assembly. The shape and dimensions of the inside of the electromagnet 29 are configured to provide only enough physical clearance with the lens housing 11 to allow unhindered motion of the lens housing as required to allow the aforementioned focusing movement. This minimum clearance allows optimization of the magnetic coupling between the electromagnet 29 and the lens housing 11 for reasons that will be described later, and is preferably in the range of 0.127-0.381 mm total clearance. Wire leads 27 serve to carry electrical energy from power supply 26 and means (not shown) exist to establish the proper direction of the magnetic field generated by the electromagnet 29 by controlling the direction of current flow through the electromagnet 29.

Figure 2:
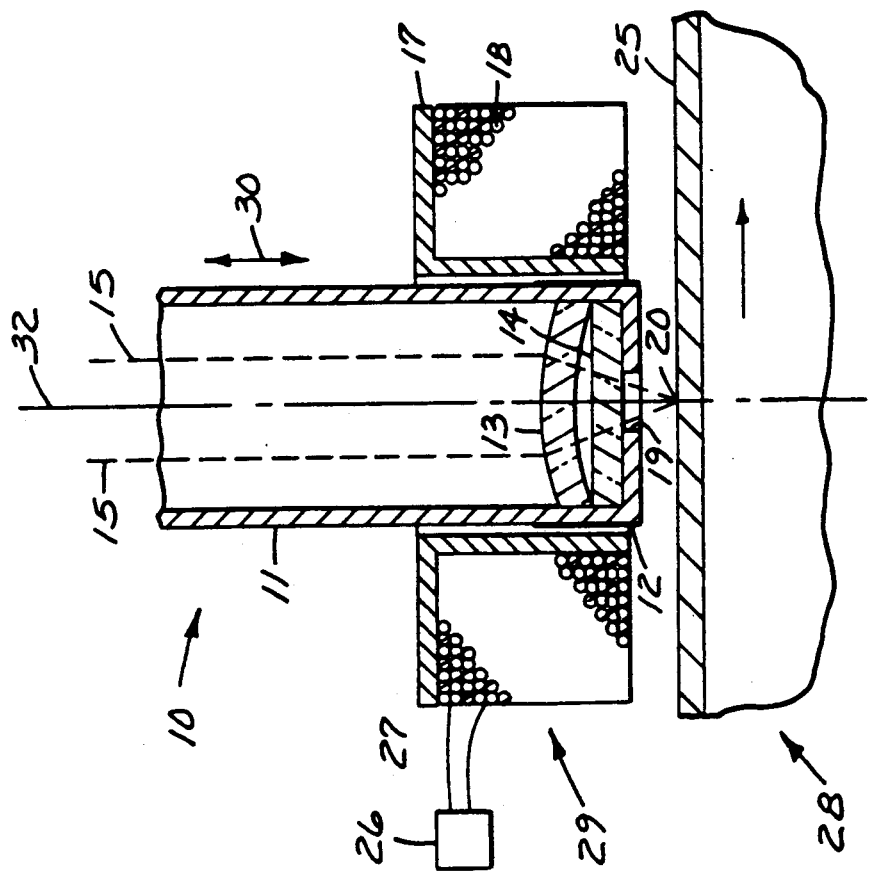
FIg. 2 is a longitudinal cross-sectional view of a second embodiment of the invention.

Essential to the functioning of the instant invention is the presence of magnetizable material as part of, or on the surface of, or in very close proximity to, the lens housing 11 at that portion of the lens housing 11 which is surrounded by the electromagnet assembly 29 and also extending across the face of the lens housing 11. In one embodiment as shown in FIG. 1, the lens housing 11 itself can be formed of iron or other magnetizable metallic alloys that have low retentivity, such as Permalloy. In a slight variation of this embodiment, the lens housing can be of brass with magnetizable material 12 applied by electroplating, by vacuum deposition, or by any of the other common and well known methods of metal deposition. The magnetizable material 12 being deposited must extend around and over both the periphery and the end of the lens housing. In yet another embodiment, as illustrated in FIG. 2, the magnetizable material is provided in the form of a cap 40, which surrounds the lens housing 11 in the required configuration around and over both the periphery and the end of the lens housing. The cap 40 can be secured to the lens housing by either adhesive means or by screw threads located on the outside surface of the lens housing and the inside surface of the cap.

Figure 3:
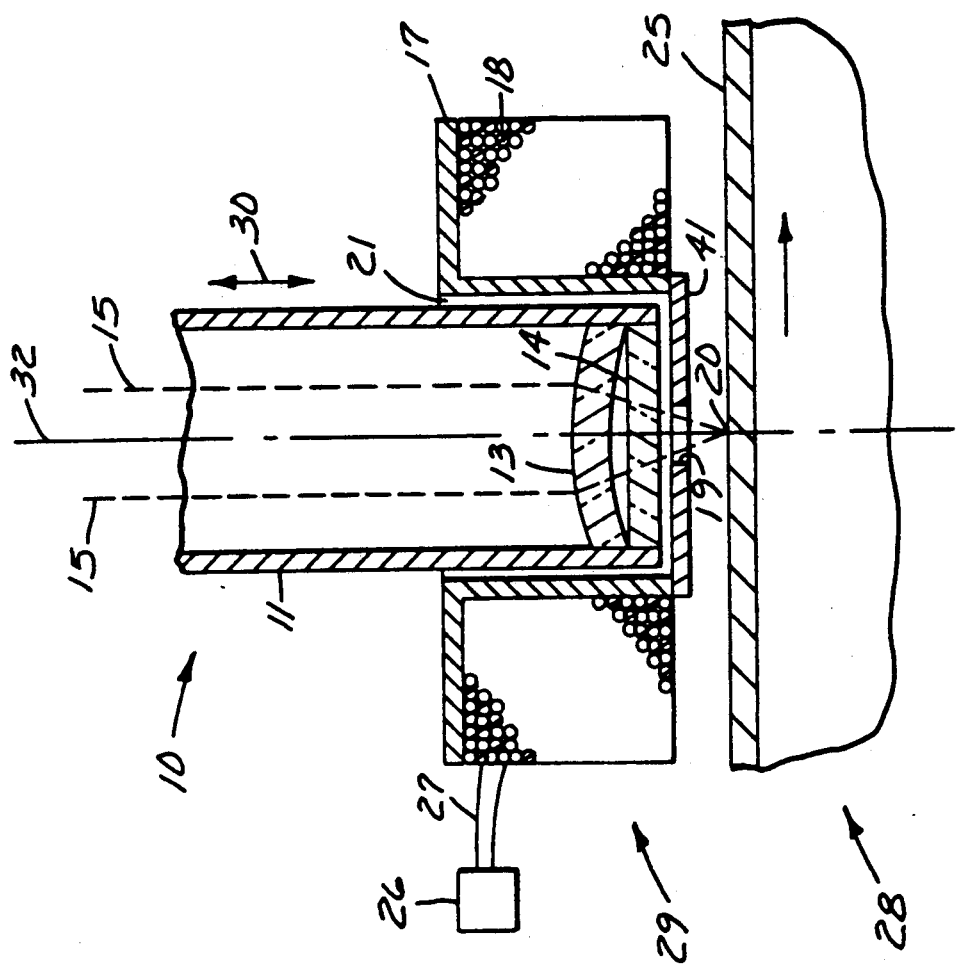
FIG. 3 is a longitudinal cross-sectional view of a third embodiment of the invention.

In yet another embodiment of the instant invention, as shown in FIG. 3, that portion of the magnetizable material which extends across the face of the lens housing may be secured not to the lens housing but to the end of the electromagnet core 17 which is located proximate to the recording media. This portion of the magnetizable material, 41 in FIG. 3, may be a disk, separate from, but attached to, the electromagnet core, or it may be an integral part of the electromagnet core, formed during the manufacture of the electromagnet core. For focusing purposes, the objective lens housing 11 must have clearance between its end and the disk 41, as well as clearance 21 between it and the inside surface of the electromagnet 29. An advantage of this approach is a reduction of the inertial mass of the objective lens housing 4.

Figure 4:
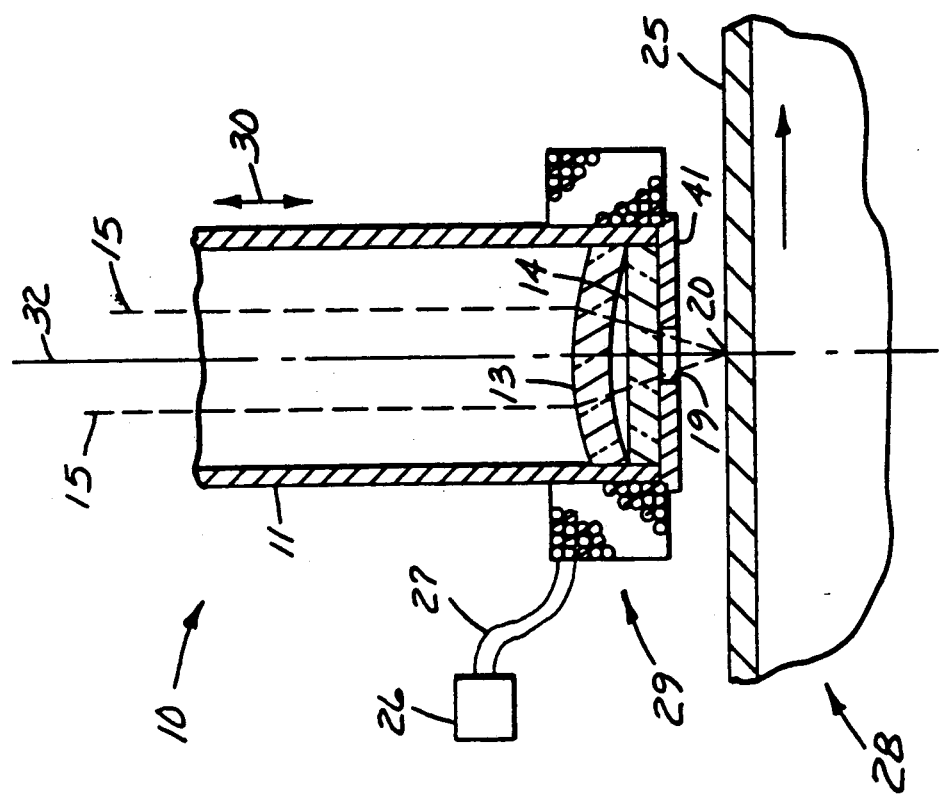
FIG. 4 is a longitudinal cross-sectional view of a fourth embodiment of the invention.

In yet another embodiment of the invention, as illustrated in FIG. 4, the aforementioned disk cap 41 is illustrated in attached directly to the end of the objective lens housing. The required electromagnet coil 29 can be wound directly on the periphery of the objective lens housing 11, and both coil 29 and disk 41 would move in conjunction with the focusing movements of the objective lens 13. In all of the embodiments described and illustrated in FIGS. 1, 2, 3, and 4, an optical aperture 19 is located in that portion of the magnetizable material covering the end of the lens housing 11 and is of a diameter sufficient to allow passage of the laser beam therethrough. The aperture 19 is located in line with the optical centerline 32 of the laser beam as it emerges from the optic assembly 10. An aperture diameter of about 1.25 mm is deemed suitable for optic systems in common usage today, but other diameters may be appropriate as technology advances and designs change. In the configurations illustrated in FIGS. 1, 2, 3, and 4, the aperture 19 may be slightly larger, or may be elongated in one direction to accommodate tracking movements of the laser beam optical system.

EXAMPLE 1

A soft iron cap was cemented to the objective lens housing of an Olympus single axis optical head as generally illustrated in FIG. 2. The outside diameter of the cap was 8.13 mm, wall thickness of the tubular portion was 0.25 mm, and the thickness of the portion extending across the end of the objective lens housing was 0.25 mm. An optical aperture of 1.25 mm diameter was located concentrically with the optical axis of the laser beam in the end cap. 600 turns of #30 magnet wire were wrapped around the tubular portion of the soft iron core whose outside diameter was 11.4 mm, an inside diameter of 8.7 mm, with a flange of 24.1 mm with a thickness of 1.25 mm attached to one end of the core, thus forming, when connected to a D.C. power supply, an electromagnet. This electromagnet was then positioned concentrically around the objective lens housing described earlier, both attached to the Olympus single-axis optical head, and mounted approximately 1 mm away from the surface of a magneto-optical recording media disk, with the centerline of the laser beam perpendicular to the plane of the media.

The modified optical head described above was then installed on an automated optical disk tester which is capable of programming such variables as disk rotational speed, laser power, magnetic bias field intensity, recording frequency, and of measuring performance factors such as signal playback amplitude, carrier-to-noise ratio, and harmonic frequency content of the playback signal. The magneto-optic media used was a 133 mm diameter disk manufactured by 3M Company, St. Paul, Minnesota. Media performance was measured first using a conventional backside electromagnet as the magnetic bias field source during recording on the disk. Since second harmonic distortion of a playback signal is the most sensitive indicator of magnetic bias effectiveness, the distortion level was measured while the magnetic bias level was changed over a range which produced a lowest....dip in distortion level, as shown in curve A of FIG. 5 wherein the vertical axis is second harmonic distortion in units of −db and the horizontal axis is magnetic coil current in units of milliamperes. The backside electromagnet was then removed from the disk tester and replaced with the elements of the invention as described above, and as illustrated in FIG. 2.

Figure 5:
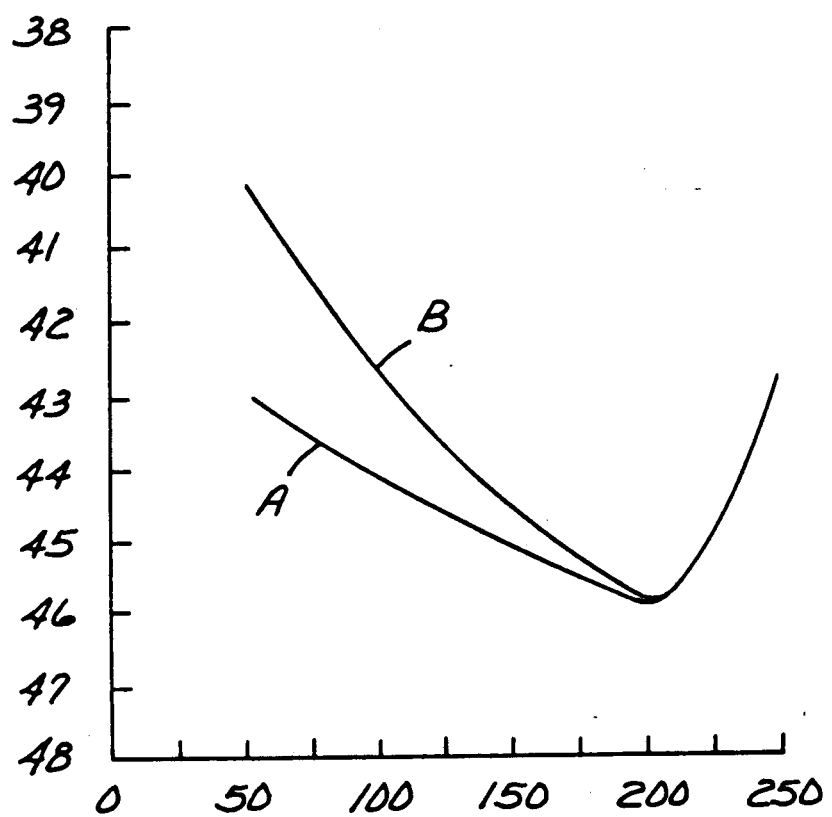
FIG. 5 is a performance graph showing that the elements of the invention give results equivalent to those obtained from the conventional "backside" bias magnet location.

Identical tests were conducted with the only variable being the source and magnitude of the magnetic bias field as controlled by magnetic coil current. Curve B of FIG. 5 shows that an identical low level of second harmonic distortion was obtained by using this embodiment of the invention. The two magnet configurations of this test were also used to erase previously written information. In both tests, with identical currents passing through the magnet coils, the signals were erased to unmeasurable low levels.

While the principles of the present invention have been demonstrated with particular regard to the illustrated structure of the various figures, it will be recognized that various departures from the illustrations may be undertaken in the practice of the invention. The scope of this invention is not intended to be limited to the elements described but should instead be measured by the breadth of the claims.

I claim:
1. An optical system for reading, recording or erasing information from or to a recording medium having a recording surface, comprising:
   a housing having a first end facing said recording medium;
   a light source for providing a beam of light through said housing and toward said recording medium;
   means within said housing for focusing said beam of light at said recording surface, wherein said focusing means comprises a lens;
   a magnetizable material extending across said housing at said first end
   an aperture in said magnetizable material of a size and disposed to allow free passage of said beam of light; and
   an electromagnet having a coil surrounding said housing and said magnetizable material for providing a magnetic field at said recording surface, wherein said housing is movable toward and away from the recording medium while said electromagnet remains stationary in this direction.
2. An optical system according to claim 1 wherein said magnetizable material extending across said housing first end is a disk of magnetizable material attached to said first end of said housing.
3. An optical system according to claim 2 wherein said electromagnet coil is disposed surrounding and in contact with said housing.
4. An optical system according to claim 3 wherein said housing is tubular and said electromagnet coil is formed on the outer circumferential surface of said tubular housing.
5. An optical system according to claim 1 wherein said light source is a laser light source for providing a beam of laser light.
6. An optical system according to claim 1 wherein said means for focusing said beam of light is a lens within said housing and adjacent said first end.

7. An optical system for reading, recording or erasing information from or to a recording medium having a recording surface, comprising:
- a housing having a first end facing said recording medium, wherein said first end of said housing is made of a magnetizable material which extends across said first end;
- a light source for providing a beam of light through said housing and toward said recording medium;
- means within said housing for focusing said beam of light at said recording surface, wherein said focusing means comprises a lens;
- an aperture in said magnetic material of a size and disposed to allow free passage of said beam of light; and
- an electromagnet having a coil surrounding said housing and said magnetizable material for providing a magnetic field at said recording surface, wherein said housing is movable toward and away from the recording medium while said electromagnet remains stationary in this direction.

8. An optical system for reading, recording or erasing information from or to a recording medium having a recording surface, comprising:
- a housing having a first end facing said recording medium;
- a light source for providing a beam of light through said housing and toward said recording medium;
- means within said housing for focusing said beam of light at said recording surface, wherein said focusing means comprises a lens;
- a magnetizable material extending across said housing at said first end, wherein said magnetizable material is a cap having an annular wall surrounding said housing and an end piece closing said annular wall, and wherein said cap is free of contact with said housing;
- an aperture in said magnetic material of a size and disposed to allow free passage of said beam of light; and
- an electromagnet having a coil surrounding said housing and said magnetizable material for providing a magnetic field at said recording surface, wherein said housing is movable toward and away from the recording medium while said electromagnet remains stationary in this direction.

* * * * *